Patented Sept. 3, 1940

2,213,799

UNITED STATES PATENT OFFICE 2,213,799

LIQUID METER

George B. Bassett, Buffalo, N. Y., assignor to Buffalo Meter Company, Buffalo, N. Y., a corporation of New York Application March 2, 1939, Serial No. 259,378

1 Claim. (Cl. 235—1)

The objects of my present invention are principally to improve the construction and arrangement of the register, register change gears, register support, register cap and other parts in the construction of liquid meters, for the purpose of reducing the cost of manufacture, allowing the more ready assemblage, separation, inspection and adjustment of the parts and giving other advantageous results.

I will now proceed to definitely describe the manner in which I have carried out my invention and then claim what I believe to be novel.

Figure 2:
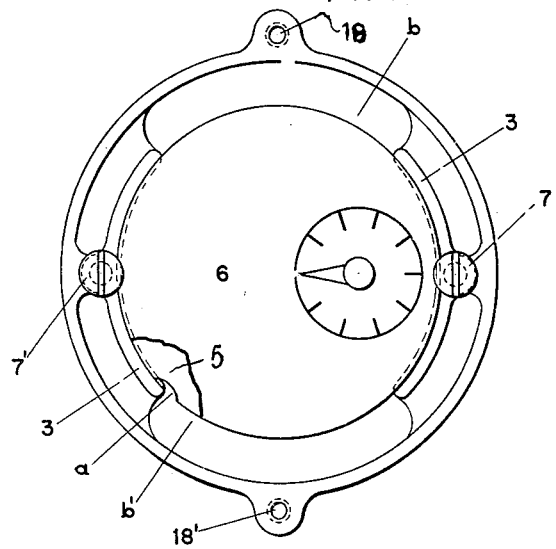
Figure 1:
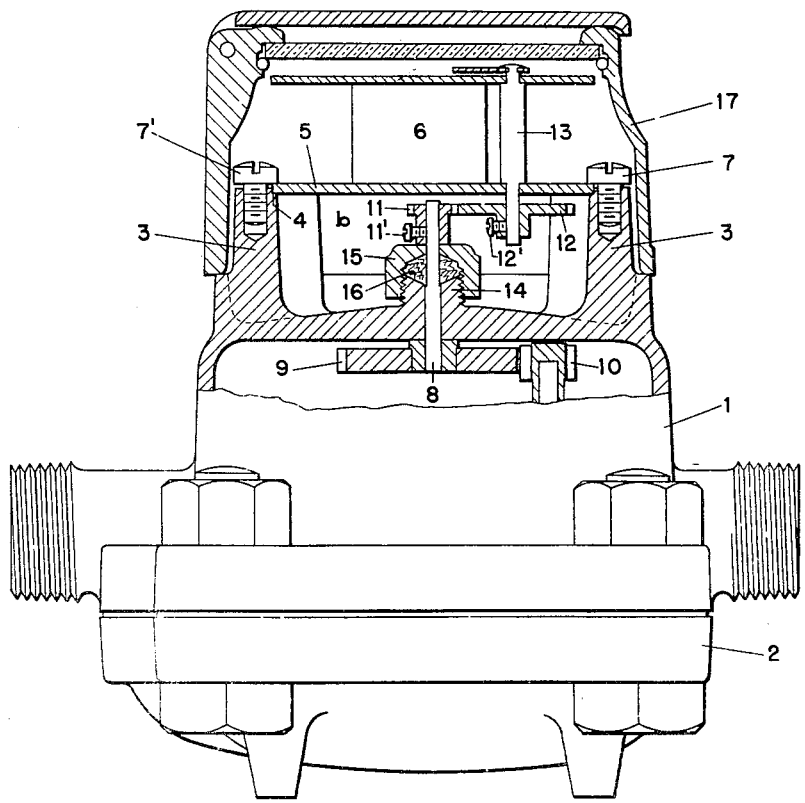

In the drawing, Figure 1 is a vertical elevation of my improved liquid meter with the register cap, register supporting cup, change gears, stuffing box and stuffing box shaft shown in section and the register shown in place on its supporting cup. Figure 2 is a horizontal downward view of the top of the meter with the register cap removed, showing the register in place on its supporting cup. The outer casing of the meter is composed of two detachable part 1 and 2 which may be fastened together by bolts passing through holes in their meeting flanges. On top of outer casing 2 is formed a register supporting cup 3 in the top edge of which is formed a circular seat 4 in which rests circular lower plate 5 of register 6, which may be rotated in various positions and clamped in place by the heads of clamping screws 7 and 7' overlapping plate 5. Lower plate 5 has a notch, a, formed in its circular edge which permits register 6 to be more readily lifted out of its supporting seat when rotated so that said notch coincides with the head of either one of clamping screws 7 and 7' without removing the screws. Stuffing box shaft 8 has rigidly fastened to its lower end stuffing box gear 9 to which motion is imparted by intermediate pinion 10 from the interior measuring parts of the meter and also has adjustably mounted on its upper end meter change gear 11 secured by set screw 11'. Meter change gear 11 meshes with register change gear 12, adjustably mounted on the lower end of register hand shaft 13 and secured by set screw 12'. Stuffing box shaft 8 passes through stuffing box 14 which is threaded to receive threaded stuffing box nut 15, by turning which packing 16 is compressed about stuffing box shaft 8 to prevent leakage.

As packing 16 is compressible and also may vary in amount the height of the top of stuffing box nut 15 on which meter change gear 11 rides will vary accordingly and change gear 11 must be adjusted to its proper height and held in place by set screw 11'. As meter change gear 11 is lowered or raised on stuffing box shaft 8, register change gear 12 must be raised or lowered on register shaft 13 to properly mesh with gear 11 and held in place by set screw 12'.

Approximately two opposite quarter sections of the side wall of register supporting cup 3 are cut away to form openings, b and b', which admit of ready observation and adjustment of the change gears 11 and 12 and also of turning the stuffing box nut 15 with register 6 in place.

Circular seat 4 is made concentric with stuffing box shaft 8 and meter change gear 11 so that, by slightly loosening clamping screws 7 and 7', register 6 may be rotated in its seat 4 to any convenient position for reading, and register change gear 12 will still properly mesh with meter change gear 11. Register 6 may then be clamped securely in its new position by tightening clamping screws 7 and 7'.

Register box 17, which encloses and protects register 6 and closes openings b and b' in supporting cup 3, is fastened to the top of the metter by screws in holes 18 and 18'. These may be of the sealing type so as to prevent tampering with the register, change gears or stuffing box.

Heretofore registers have been supported on the top of a liquid meter in two ways. One way, called the post support, has the bottom plate of the register held on the top of supporting posts by screws passing through holes in the bottom plate of the register. The advantage of this post support is that the change gears and stuffing box may be observed and adjusted with the register in place.

The disadvantage of this post support is that the register cannot be rotated in its seat for most convenient reading and for resetting the test hand to exact zero between tests when a number of meters are connected in series for purpose of testing at various rates of flow. This post support is illustrated in Patent No. 501,203, granted me July 11, 1893.

The other way, called the cup support, has the circular bottom plate of the register resting in a circular seat cut in the top edge of a supporting cup formed on the top of the meter, and is clamped therein by the bottom edge of the register cap. The advantage of this cup fastening is that the register may be rotated in its seat to any position for most convenient reading and also, when a number of meters are connected in series for purpose of testing at various rates of flow, the test hand of each meter may be reset to exact zero by slightly rotating each register on its meter, if need be between tests.

The disadvantage of the cup support is that the change gears and stuffing box cannot be observed nor adjusted with the register in place.

This cup fastening is illustrated in Patent No. 1,190,705 granted me July 11, 1916.

My present invention combines the advantages of both the post support and the cup support in the one meter without the disadvantages of either.

Having thus described my invention, what I claim as new and desire to secure by Letters Patent is:

A liquid meter comprising a meter casing having a top wall provided with an upwardly extending annular wall forming a register supporting cup and having a circular seat formed at the upper portion thereof, a register having a circular lower plate arranged with its edge rotatably supported on said seat, a gear rotatably mounted on the lower face of said lower plate, another gear rotatably mounted on the upper face of said top wall and meshing with said first mentioned gear, and arranged with its axis, substantially coinciding with the center of said lower plate, a pair of clamping screws engaging in threaded holes formed in said upper portion of said annular wall beyond the edge of said seat, said clamping screws having heads extending over said seat and arranged to engage the edge of said lower plate to clamp the same in fixed relation on said seat, said lower plate having a ntch formed in the periphery thereof through which a head of one of said screws may pass when said notch and screw head are in vertical registration and when said portion of said bottom plate is raised, to permit said bottom plate to be removed from its seat without removing either of said screws and to move said gears out of operative relation to each other.

GEORGE B. BASSETT.